TENSILE MODULUS AND PERCENT ELONGATION VS. α-OLEFIN CHAIN LENGTH

United States Patent Office 3,728,185
Patented Apr. 17, 1973

3,728,185
OLEFIN-SO₂ COMPOSITIONS CONTAINING FINELY DIVIDED FUSIBLE INORGANIC MATERIAL AND METHOD FOR BONDING THEREWITH
Don N. Gray, Sylvania, Ohio, assignor to Owens-Illinois, Inc.
Filed May 22, 1970, Ser. No. 39,769
Int. Cl. B32b 31/26; C08f 13/06
U.S. Cl. 156—89
18 Claims

ABSTRACT OF THE DISCLOSURE

Compositions comprising a pyrolyzable olefin-$SO_2$ polymer having uniformly distributed therethrough a finely divided inorganic fusible or sinterable material, for example, sealing glass. The composition can be extruded into tape form, the tape applied to a surface or between surfaces, and then heated to a temperature sufficient to pyrolyze the polymer into gaseous components and also sufficient to sinter or fuse the inorganic particulate material onto the surface or surfaces.

DESCRIPTION OF THE INVENTION

Figure 1:
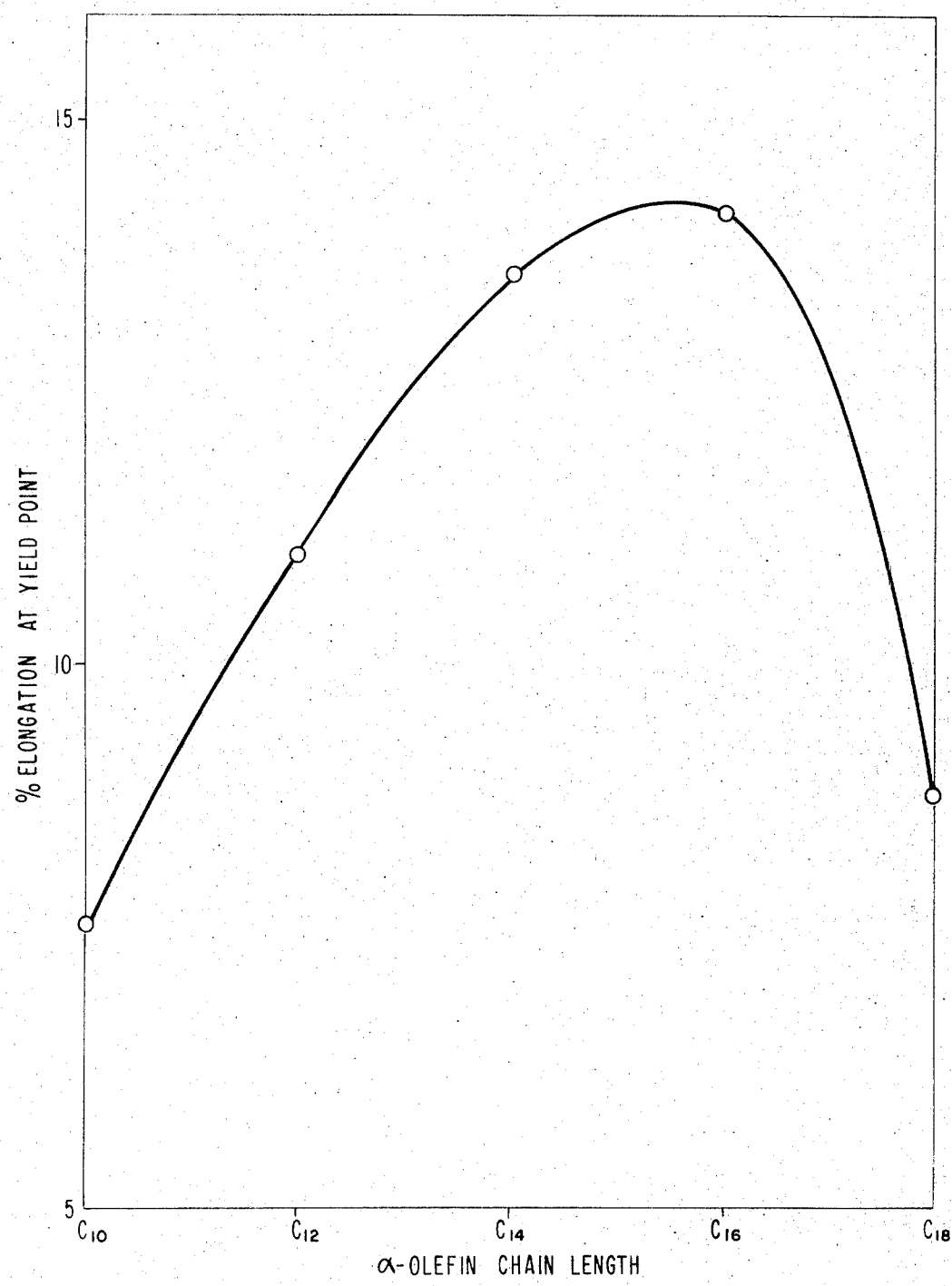

This invention relates to a composition and to a thin, flexible film made therefrom. More particularly, this invention relates to a composition comprising a finely divided, sinterable or fusible inorganic material dispersed throughout a substantially completely pyrolyzable olefin-$SO_2$ polymeric binder.

Particulate inorganic materials such as sealing glasses are conventionally applied to substrates by a wet method, that is, while dispersed in a binder-solvent system. This method requires mixing the binder, the solvent, and the inorganic material to form a paste or slurry which is then applied to the surface to be coated. The viscosity of the paste varies with the temperature and with the particle size distribution of the inorganic material. Moreover, the viscosity of such compositions also changes with time and, hence, continual agitation is necessary to maintain proper suspension. In addition, the mixing and application sequence has the inherent disadvantages of handling a liquid or semi-liquid system, including clean-up, spillage, volatile solvents, etc. Often, quality control is difficult to maintain and the wet technique is usually costly in time and material.

Such a wet coating technique has been used to seal glass or ceramic parts, as in the formation of cathode ray tubes wherein the face plate is attached to the funnel. In this technique, a paste having a finely divided sealing glass distributed throughout a binder-solvent system is applied to the edges of one part of the tube in the form of a ribbon. The remaining tube part is then placed in contact with the paste, and the assemblage is heated to a temperature sufficient to burn out the binder and fuse the sealing glass. While this technique is extensively used in the television tube industry, quality control is somewhat difficult and expensive to maintain.

In an effort to overcome the difficulties inherent in coating substrates using a binder-solvent system, others have suggested using dry coating compositions containing polymeric binders and having the particulate coating material uniformly distributed therethrough. These compositions are formed into films which are applied to the substrate to be coated and then heated to burn out the binder and form a coating of the inorganic material, usually in fused or sintered form.

Polymethacrylate and polyisobutylene have been used in the prior art for this purpose, but have not proven to be entirely satisfactory. For one thing, these polymeric compositions cannot be conveniently extruded in film form. Films of these compositions are formed by solvent casting which involves many of the disadvantages inherent in the conventional use of binder-solvent systems for applying inorganic sealing glass coatings. On decomposition, the polymethacrylate and polyisobutylene binders of the prior art leave a detectable carbonaceous residue. This carbonaceous residue is detrimental to successful use of polymeric materials of the prior art for many important applications. On heating the carbonaceous residue reduces metals present as oxides to their elemental state. When the coated material is used in electrical applications, the presence of an electrically conductive metal film is disadvantageous. For instance, when the inorganic coating material is sealing glass (usually containing lead), the carbonaceous residue acts to reduce the lead oxide to metallic lead. When this metallic lead is present in a seal in a cathode ray tube, it conducts electricity and the tube must be rejected as being unusable. Also, the aesthetic value of the coated piece is decreased by the presence of free metals and this has detracted from the use of the prior art films in glazing. Notwithstanding efforts of workers in the art, inorganic coating compositions, including sealing glass compositions, are still being applied by the aforementioned wet method.

Accordingly, it is an object of this invention to provide a composition which overcomes many of the disadvantages discussed above.

Another object of this invention is to provide a composition containing a finely divided, fusible or sinterable inorganic coating material and a polymeric binder, which polymeric binder can be pyrolyzed to leave essentially no solid carbonaceous residue.

Still another object of this invention is to provide a self-supporting tape or film comprising particulate inorganic material and a binder therefor which is pyrolyzable and leaves substantially no solid carbonaceous residue.

Another object of this invention is to provide a self-supporting sealing tape for use in sealing two siliceous surfaces together, such as glass surfaces, and more particularly glass components of television tubes.

In accomplishing these objects, one feature of this invention broadly resides in a composiiton comprising a pyrolyzable polymer of sulfur dioxide and one or more olefins, the polymer having uniformly distributed therethrough an amount of a finely divided, fusible or sinterable, inorganic material sufficient to perform the desired function, such as sealing two glass surfaces together.

Another feature of this invention resides in an article comprising a thin, flexible, solid film of a pyrolyzable polymer formed by the reaction of sulfur dioxide with one or more olefins, the film having uniformly distributed therethrough an amount of a finely divided inorganic material sufficient to perform the desired functioin, such as sealing two glass surfaces together.

Other objects, features and advantages of the present invention will become apparent to those skilled in the art from the detailed description of the invention which follows and the drawing which accompanies the application.

In accordance with this invention, it has been found that olefin-$SO_2$ polymers are excellent binders for coating compositions containing finely divided, inorganic materials, such as sealing glasses. On heating, olefin-$SO_2$ polymers decompose to yield sulfur dioxide and the olefin, with essentially no solid carbonaceous residue being formed.

Any finely divided, sinterable or fusible, inorganic material can be utilized to make the composition of this invention. By "finely divided, sinterable or fusible, inorganic material" is meant an inorganic material, in finely divided form, which can be applied to a substrate in the form of a thin film or coating and which can be fused or sintered onto the substrate. The choice of such materials is virtually unlimited. Suitable materials include, by way of example and not limitation, oxides such as silica, alumina, and boric oxide; decorative glazes which are glassy compositions containing low-melting compounds or fluxes such as the alkali metal oxides, boric oxide and lead oxide; electron-emissive compounds, such as the carbonates of barium, strontium and calcium; metals and metallic alloys, such as copper, silver, nickel, etc.; glasses, and thermally crystallizable glasses.

In a preferred embodiment of this invention, the inorganic material is a sealing glass. Sealing glasses are well-known in the art and are used to seal glass or ceramic surfaces to other glass, ceramic or metallic surfaces. They are also used to coat substrates, especially electrical components such as microcircuits, which may be an alumina, silica or other known substrate. Vitreous and devitrifiable sealing glasses are known in the art and are commercially available. Both types of sealing glass can be used in practicing this invention. Exemplary sealing glasses for use in the present invention are disclosed in U.S. Pats. Nos. 2,866,298; 2,931,142; 2,936,923; 3,061,664; 3,063,198; 3,080,329; 3,088,833; 3,088,834; 3,088,835; 3,127,278; 3,250,631; 3,291,586 and 3,368,024; all assigned to the assignee of this invention, and these glasses are all incorporated by reference.

The amount of finely divided sinterable, or fusible, pyrolyzable binder and subsequently extruded as a film or tape for specific purposes will vary with the intended purpose. Thus, when a pyrolyzable sealing tape is to be made for use in sealing a face plate to the funnel of a television tube, the amount of the binder will be up to about 10 weight percent of the composition and, preferably, from about 2 to about 10 weight percent of the composition. The remainder of the composition will comprise the particulate inorganic material which, for this purpose, would be a sealing glass. If required, a small amount of plasticizer for the binder may be incorporated into the composition, as will be more fully explained infra.

When the composition of the invention is to be used as a tape or film for glazing microcircuitry, i.e., to cover a chip containing a microcircuit, the amount of binder present in the composition can be up to about 20 weight percent of the composition and, preferably, from about 2 to about 20 weight percent. Again, a plasticizer for the binder may be incorporated in the composition if desired.

To make sealing compositions or tapes or films for other uses wherein particulate inorganic material is to be sintered or fused onto a surface, such as a siliceous, ceramic, or glass surface, or even onto metal or metal alloy surfaces, the amount of pyrolyzable binder present in the composition and in the films and tapes made therefrom can vary up to about 90 weight percent of the composition. Thus, in its broadest aspect, the binder can be about 2 to about 90 weight percent of the composition, the remainder being essentially the particulate inorganic material and, if necessary, a minor amount of plasticizer for the binder. However, for many practical purposes, the amount of binder can be from about 2 to about 50 weight percent of the composition.

The binder used in the present invention is a polymer of sulfur dioxide with one or more olefins. Such olefin-sulfone polymers are known in the prior art. Olefin-$SO_2$ are readily formed by known methods by reacting sulfur dioxide with one or more olefins using, for example, free radical catalysts. Polymerization of olefins and $SO_2$ can be carried out under low autogenous pressures and mild temperatures using free radical catalysts, such as peroxides, hydroperoxides, $\alpha,\alpha'$-azobisisobytyronitrile, $\alpha,\alpha$-azobis($\alpha,\alpha$-dimethylvaleronitrile), etc. Low temperature liquid-phase ultraviolet-catalyzed polymerization can also be used wherein the polymerization of the olefin and sulfur dioxide is accomplished in an inert solvent, such as chloroform or toluene. Emulsion copolymerization of sulfur dioxide with unsaturated monomers can also be employed using the usual peroxide, hydroperoxide, etc., known catalysts or oxidizing agents, which are not affected by the aqueous medium. Ammonium nitrate and lithium nitrate are examples of such catalysts.

For purposes of this invention, the $SO_2$-olefin polymers found to be suitable have a molecular weight of from about 20,000 to 30,000 up to 100,000 or more as determined by the known membrane-osmometry method.

In the present invention, sulfur dioxide polymers with olefins having from 6 to 30 carbon atoms, and mixtures of such olefins, are used. The resulting polymers can be represented by the formula:

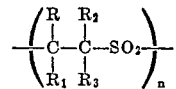

wherein R, $R_1$, $R_2$ and $R_3$ are hydrogen or alkyl with the total number of C atoms in $R_1$, $R_2$, $R_3$, and R not exceeding 28, and $n$ is an integer of at least 6. Best results are obtained with olefins having 12 to 20 carbon atoms, and particularly with olefins having 14 to 18 carbon atoms as will be discussed infra. Usually, alpha- or 1-olefins are used.

Exemplary olefin-$SO_2$ polymers for use in the present invention are those made by the reaction of sulfur dioxide with 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, 1-undecene, 2-undecene, 3-undecene, 4-undecene, 1-dodecene, 2-dodecene, 3-dodecene, 1-tridecene, 1-pentadecene, 1-hexadecene, 1-heptadecene, 1-octadecene, 1-nonadecene, 1-eicosene, 1-henecosene, 1-docosene, 1-tricosene, 1-tetracosene, 1-pentacosene, 1-triacontene, and 3,4-dimethyl-2-hexene. Often, mixtures of two or more such olefins are useful in forming the polymers for use in the invention.

A copolymer of an alpha-olefin and sulfur dioxide can be made in accordance with the following process, although other processes known in the art also can be used.

EXAMPLE I

To a glass container were added 40 parts of liquefied sulfur dioxide and 30 parts of octene containing 0.3 part of t-butyl hydroperoxide. All parts were by weight. The container was sealed and the contents were allowed to react at room temperature for 50 hours. The container was vented and the contents were removed and placed in an oven at reduced pressure to remove the excess $SO_2$ and any unreacted olefin. 45.56 parts by weight of solid $SO_2$-octene polymer were obtained.

In preparing the compositions of this invention, the olefin-$SO_2$ polymer can be mixed with the finely divided, inorganic material either by the use of a solvent or by dry blending the ingredients. For example, the finely divided material and the olefin-$SO_2$ binder are mixed with a solvent, such as methyl ethyl ketone in a ball mill until a homogeneous composition is obtained. The mixture is then cast onto a suitable surface employing appropriate apparatus such as an adjustable film casting knife to obtain a film of desired thickness.

However, at times it may not be convenient to prepare a relatively thick film in a single pass due to the size and weight of the inorganic particles and/or the viscosity of the polymer. In such a case, a film of the desired thickness can be conveniently prepared by laminating several thin films, i.e., films that range in thickness from 6 to 8 mils to produce a thicker film or tape that may range in thickness between 30 and 40 mils, for example. A thick, heavy, wet film may be difficult to cast since the heavy, finely divided sealing glass particles will settle before enough solvent evaporation has occurred to raise the viscosity of the composition sufficiently to prevent migration or settling of the particles. A film in which the inorganic particles have settled is easily recognizable. The bottom of such a film usually has a chalky appearance and dusts easily.

To prepare a thicker film laminate, a number of thin films can be pressed together in a small platen press using about 10,000 p.s.i. pressure. If after the first pressing the tape is still too thin for the desired use, one or more layers of thin tape can be added, and the laminate can be repressed or reformed as desired. The details of such mechanical operations will be clear to the person skilled in the art.

A particularly desirable method of making the films or tapes of the present invention is by extrusion. The components, i.e., glass or other finely divided, inorganic materials can be mixed with the olefin-$SO_2$ binder at any convenient stage, preferably immediately ahead of the extrusion die, and satisfactory tapes of desired thickness are obtained. Extrusion is less costly than solvent casting and the subsequent lamination and shaping of the tape or film can be more easily accomplished. Furthermore, extrusion is a faster procedure since there is no need to wait for solvent evaporation. The extrusion method is thus particularly desirable when forming tapes of the compositions of the present invention.

Generally, the tape formulation for extrusion can be made in a number of ways. For instance, the polymeric alpha-olefin sulfone may be dissolved in some convenient solvent, such as benzene, toluene, methyl ethyl ketone, ethylene dichloride, or the like. After dissolution, the plasticizer, if required, is added. The finely divided sealing glass is then added and the mixture is stirred to prevent segregation of the heavier solder glass. Some solvent is evaporated and a thick casting cement is obtained. This is dried to obtain a dry homogeneous mix. This mix can then be compacted and extruded by any number of means, the simplest of which is a piston extrusion apparatus where the head of the extrusion die is heated to such a temperature as to cause flow of the formulation. The temperature is chosen to be above the melting point of the polymer but below its decomposition point so that degradation of polymer properties does not occur.

It is possible to eliminate the solvent in the mixing sequences described above. This is done by swelling the olefin sulfone polymer with a plasticizer, such as acetyltribuyl citrate, to give a nearly dry swollen bead. The polymer is then mixed dry with finely divided sealing glass in a twin-cone mixer for several minutes and then placed in an eleastic melt extruder. This extruder mixes by utilizing high shear. The tape emerging from the extruder head shows good homogeneity. By shaping the die head on the elastic melt extruder to form the required tape size, one need only mix the three components, i.e., polymer, plasticizer, and sealing glass, place them in the hopper of the elastic melt extruder and extrude the tape onto a wind-up reel. Hobart food mixers can also be used as well as a variety of other mixing apparatus, as will be apparent to one skilled in the art.

At high sealing glass loading levels, i.e., 80 to 90 percent or more by weight of sealing glass, the tape or film may have incorporated therein a small but sufficient amount of a plasticizer for the $SO_2$-olefin copolymer to impart the necessary flexibility properties to the tape. Otherwise, tapes having such a high sealing glass loading level have a tendency to be brittle and break as the tape is manipulated onto a surface prior to sealing. Suitable plasticizers include low molecular weight polyisobutylene, esters of citric acid, such as acetyltributyl citrate, low molecular weight polyvinyl methyl ether, hexadecene, $C_{14}$ to $C_{20}$ straight-chain alpha-olefins, and the like, all of which are compatible with the composition and can be pyrolyzed without leaving an undesirable carbonaceous deposit or are fugitive, i.e, vaporize or boil off, at a temperature below the annealing point of the sealing glass. However, the plasticizer should not be fugitive at room temperature since this would unduly shorten the shelf life of the sealing tape.

Generally, an amount of plasticizer which is about 2 to 4 weight percent of the composition is satisfactory to impart the necessary flexibility to the sealing tape or film. Flexibiilty is determined by folding and unfolding a corner of the tape sharply upon itself. If the tape does not crack, it is considered to have satisfactory flexibility. Amounts of plasticizer to polymer are usually from about 1:2 to about 1:4 with the latter giving very satisfactory results.

As indicated above, the amount of the several ingredients in the tape composition of the present invention will vary with the particular end use for the tape. If the tape is to be used in sealing television tubes, optimum range of the solder glass to polymer or polymer plus plasticizer is between about 90 to 95 percent by weight of the tape. For thick film microcircuit applications, the sealing glass may be present in lesser amounts, but preferably at least 80 percent by weight. Anything less than 80 percent solder glass means that a larger amount of polymer must be pyrolyzed. It is desirable to have the tape consist of as much solder glass as possible and to keep the amount of polymer to be pyrolyzed as low as possible, consistent with obtaining the desired properties of strength, flexibility and formability in the tape.

According to the preferred embodiment of the present invention, the sealing tapes contain from 92 to 97% by weight of finely divided inorganic material, particularly sealing glass, and from 3 to 8% of the $SO_2$-olefin polymer and, if necessary, from 2 to 4% of the compatible and pyrolyzable or fugitive plasticizer. The preferred compositions in the present invention can be solvent-cast into tapes which are then used for sealing purposes or they can be formed by thermal extrusion. The latter is the preferred method whereby the dry blend of finely divided, inorganic sealing glass and olefin-$SO_2$ copolymer are blended immediately ahead of the extrusion die. The composition is then extruded into the desired film shape.

When used in sealing operations, the sealing tape is cut to size and placed on the surface of one member to be sealed. After heating the tape to a tacky condition, the other member to be sealed is placed on the tape and the assembly of the two members having the tape interposed therebetween in sealing relationship is placed into a furnace. The temperature of the furnace is increased to that at which the olefin-$SO_2$ copolymer is pyrolyzed, the plasticizer is either pyrolyzed or becomes fugitive, and the sealing glass is fused to seal the two members together.

A representative firing cycle is heating at a rate of 10° C. per minute to a temperature of 450° C. where the assembly is held for 60 minutes and then cooling at a rate of 5° C. per minute. This pyrolysis or "burn out" cycle can be varied widely depending on the particular ingredients and the purposes and nature of the articles which are sealed together.

Representative of the thin tapes produced according to this invention are those which are rectangular in cross-section and have dimensions of ¼″ x ⅛″. However, it is to be noted that the cross-section can vary, for example, a semi-circular cross-section having a radius of 7/64″ has been found to be satisfactory for sealing small sections of glass.

The tape for glazing microcircuitry is on the order of about 10–40 mils and is extruded in wide widths of up to six inches or more. It is placed on a number of alumina or silica chips, the tape and chips are fired at once, and then the glazed tape or sheet is broken to obtain the individual chips. Alternatively, the tape can be stamped and cut to fit each individual chip, placed on the chip, and fired. A particular advantage of the tape of the invention is its ability to be diecut to form shapes without resorting to screen printing.

The following examples are illustrative of the present invention and modifications therein will be readily apparent to those in this art from the above disclosure.. The olefin-SO₂ copolymers were made in the manner disclosed in Example I, and the molar ratios of SO₂ to olefin were kept the same as in Example I. The molecular weights of the copolymers formed came within the range of about 30,000 to 100,000 or more. The molecular weight of the Example I copolymer was 101,000.

EXAMPLE II

A tape was prepared from the following formulation:

|  | Percent by weight |
|---|---|
| Poly-α-tetradecene sulfone | 6.25 |
| Acetyltributyl citrate | 1.56 |
| Ethylene dichloride | 21.88 |
| Powdered lead sealing glass | 70.31 |
|  | 100.00 |

The binder, plasticizer and solvent were weighed into a jar containing a few half-inch cylindrical mill balls. The tightly capped jar was put on power-driven rollers so as to rotate the jar until solution of the binder was complete. The finely divided solder glass was then added to the solution, the jar returned to the rollers and the rotation of the jar was continued. A five-inch Gardner knife was used to cast a portion of the slurry onto a silicone-treated release paper. A knife setting of 25 mils was used and the cast slurry was then air-dried. The tape was then cut into strips measuring ½ inch by 2¼ inches and each strip was placed on an alumina substrate. The substrates were then fired in a furnace at the rate of 13.5° F. per minute to a temperature of 790° F., held at this temperature for 8 minutes, and then the temperature was increased to 950° F. in 3 minutes and the substrates held at this temperature for 16 minutes. They were then removed from the furnace and allowed to cool to room temperature. The sealing glass had fused with excellent adhesion to the substrates, and the glasses had a high order of gloss. The tape did not "crawl" during the heating step. No trace of polymer binder was noted in the fused glasses.

EXAMPLE III

A sealing tape was prepared by a solvent-casting procedure wherein the finely divided solder glass was added to a solution of poly-α-tetradecene sulfone binder in methyl ethyl ketone. The mixture was ball-milled for 16 hours (screw-cap glass jar with Teflon film between glass and cap, cylindrical "Burundum" grinding media). The resulting dispersion was cast onto a 20-mil Teflon sheet using a Gardner Multiple Clearance Film Applicator having a 30-mil clearance. The tape was allowed to dry overnight at room temperature and removed from the Teflon backing prior to sealing. The composition from which the tape was made was as follows:

|  | Percent by weight |
|---|---|
| Poly-α-tetradecene sulfone | 8 |
| Acetyltributyl citrate | 2 |
| Powdered lead sealing glass | 90 |

The tape had excellent flexibility and, when fired onto alumina substrates for 3 minutes at 880° F. the sealing glass fused to a good glaze having a high order of gloss with no trace of plasticizer or polymer binder remaining therein.

Satisfactory tapes having good fusing and sealing properties after firing for 3 minutes at 880° F. were also made from the following compositions by the procedure described in Example II:

EXAMPLE IV

|  | Percent by weight |
|---|---|
| Poly-α-tetradecene sulfone | 4 |
| Acetyltributyl citrate | 2 |
| Powdered lead sealing glass | 94 |

EXAMPLE V

|  | Percent by weight |
|---|---|
| Poly-α-tetradecene sulfone | 4 |
| Powdered lead sealing glass | 96 |

EXAMPLE VI

|  | Percent by weight |
|---|---|
| Poly-α-octene sulfone | 4 |
| Powdered lead sealing glass | 96 |

EXAMPLE VII

|  | Percent by weight |
|---|---|
| Poly-1-dodecene sulfone | 4 |
| Powdered lead sealing glass | 96 |

EXAMPLE VIII

|  | Percent by weight |
|---|---|
| Poly-1-hexene sulfone | 4 |
| Acetyltributyl citrate | 2 |
| Powdered lead sealing glass | 94 |

EXAMPLE IX

|  | Percent by weight |
|---|---|
| Poly-1-decene sulfone | 8 |
| Acetyltributyl citrate | 2 |
| Powdered lead sealing glass | 90 |

The tape of Example IX had an unfired thickness of .0117" when applied to an alumina substrate. After firing at 13.5° F./min. to 770° F., during which the binder was pyrolyzed and the plasticizer vaporized, the thickness of the resulting glaze was .0065".

EXAMPLE X

|  | Percent by weight |
|---|---|
| Poly-α-octene sulfone | 4 |
| 1-hexadecene | 2 |
| Powdered lead sealing glass | 94 |

EXAMPLE XI

A sealing tape having the following composition is extruded from a die so that the tape has a semi-circular cross-section:

|  | Percent by weight |
|---|---|
| Poly-1-hexadecene sulfone | 4 |
| Acetyltributyl citrate | 2 |
| Powdered lead sealing glass | 94 |

A television tube funnel and face plate are then sealed with the tape. One edge of the funnel is preheated to 120° F. using a hot air blower. As the tape is unrolled from the spool, it is heated by a hot air gun until soft and sticky and pressed by hand onto the preheated funnel edge. The face plate is then placed in position on the preheated funnel with the sealing tape disposed therebetween. The assembly is then placed in a surface combustion gas-fired forced convection oven and heated at a rate of 10° C. per minute to a temperature of 450° C. and held there for 60 minutes. Then it is cooled at a rate of 5° C. per minute to room temperature. A satisfactory seal is formed and no trace of any binder or plasticizer is noted.

The finely divided sealing glass of Example XI has the following composition:

|  | Weight percent |
|---|---|
| PbO | 74.8 |
| B₂O₃ | 8.3 |
| ZnO | 12.8 |
| SiO₂ | 2.1 |
| BaO | 2.0 |

The finely divided sealing glass of Examples II–X is about 95% of a finely divided glass having the following composition:

|  | Weight percent |
|---|---|
| PbO | 71.3 |
| B₂O₃ | 10 |
| SiO₂ | 1.9 |
| ZnO | 15.9 |
| SnO₂ | 1 | mixed with about 5% of a finely divided glass-ceramic material having a coefficient of thermal expansion of about $-1 \times 10^{-7}$ over the range 0–300° C. and having a composition of Example 42 of U.S. patent application Ser. No. 464,147, filed June 15, 1965, and British Pat. No. 1,124,001, corresponding to said U.S. patent application; this glass-ceramic was melted, cast as a glass, and heat treated in the manner described in said U.S. patent application and said British patent to obtain a glass-ceramic containing predominantly beta-eucryptite-like crystals.

While excellent tapes are produced by the mixture of pyrolyzable olefin-sulfone copolymer binders with finely divided inorganic materials, such as lead sealing glass, the presence of a minor amount of plasticizer for the copolymer binder does improve the flex properties of the tape. Up to about 5 weight percent of the tape composition can be plasticizer, and the ratio of binder to plasticizer can vary from about 1:1 to about 4:1, with the range of about 2:1 to about 4:1 being preferred.

Figure 2:
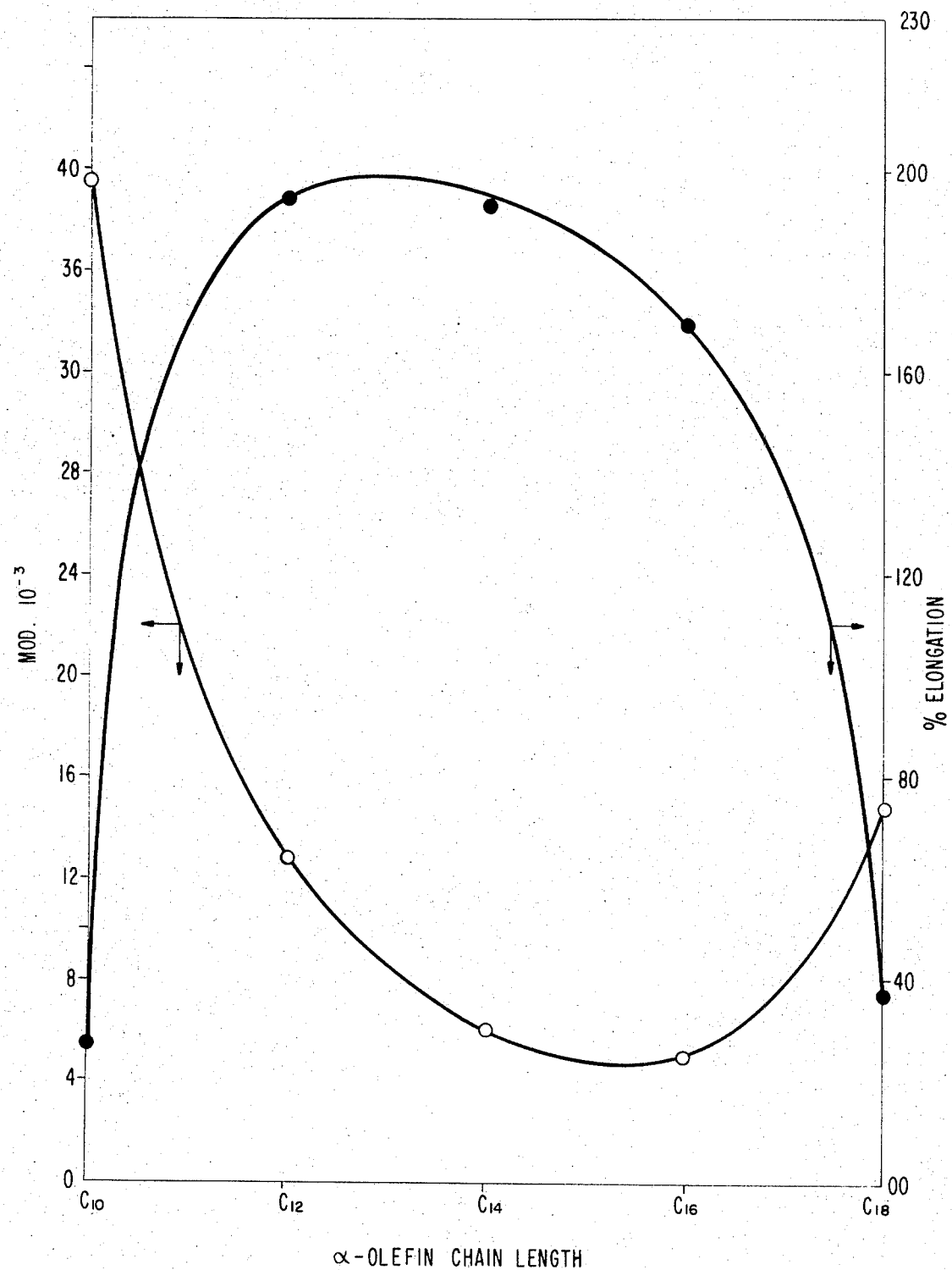

While the olefins suitable for the present invention are those having from 6–30 carbon atoms and prefeably have 12 to 20 carbon atoms, it has been found that the alpha-olefins having from 14 to 16 carbon atoms form olefin-$SO_2$ copolymers which impart excellent flexibility and elastomeric properties to the films and tapes of the present invention. Using such olefin-sulfone copolymers necessitates only the minimum amount of plasticizer, if any, to obtain good flexibility in a highly loaded sealing glass tape. As seen in FIG. 1 of the drawings, the percent elongation at the yield point is the highest when the $\alpha$-olefin chain length is 16 carbon atoms, and it is slightly lower at 14 carbon atoms. In FIG. 2, tensile modulus and percent elongation are charted for the $\alpha$-olefins, and percent elongation is highest for the 12–16 carbon olefins, and the tensile modulus is the lowest for the 14–16 carbon olefins.

Not only do the sealing glass tapes made from the 14–16 C atom olefin-sulfone copolymers have excellent flexibility and require the minimum, if any, plasticizer, but fired glazes and seals from such tapes have the best appearance and the binders are readily pyrolyzed and leave no detectable carbonaceous residue.

Casting of the sealing glass tape directly onto a carrier material, such as a plastic film, i.e., Teflon, polyethylene, etc., or release paper, to which the tape does not adhere, is also contemplated by the present invention. Such a carrier provides mechanical support and protection, and would prevent adjacent layers of tape or film from sticking to one another.

A sealing glass slurry may be deposited onto a support carrier and the thickness of the slurry made uniform by means of doctor blade. The slurry is dried in a forced air hood and the paper-backed tape is then wound onto a receiving roll. When the tape is extruded instead of cast, it may be deposited onto a carrier, such as the aforementioned paper or plastic films, dried, and wound onto a receiving roll. Thus, there is no opportunity for any portion of the tape to adhere to any adjacent portion during storage.

It is understood that various other modifications will be apparent to and can readily be made by those skilled in the art without departing from the scope and spirit of this invention. Accordingly, it is not intended that the scope of the claims appended hereto be limited to the description set forth herein, but rather that the claims be construed as encompassing all of the features of patentable novelty which reside in the present invention including all features which would be treated as equivalent thereof by those skilled in the art to which this invention pertains.

What is claimed is:

1. As an article of manufacture, a solid, flexible film consisting essentially of about 2 to about 90 weight percent of at least one copolymer of $SO_2$ with an olefin having from 6 to 30 carbon atoms and having distributed throughout said copolymer about 10 to about 98 weight percent of a finely divided fusible or sinterable inorganic material, said copolymer being pyrolyzable at a temperature below the sintering or fusing temperature of said inorganic material and leaving substantially no carbonaceous residue when pyrolyzed, and about 0–5 weight percent of a plasticizer fugitive at the temperature at which said copolymer pyrolyzes.

2. The film defined in claim 1 wherein said inorganic material is a sealing glass and is present in an amount of about 80 to about 98 weight percent of said film.

3. The film as defined in claim 1 wherein said inorganic material is a sealing glass and is present in an amount of about 90 to about 98 weight percent of said film.

4. The film as defined in claim 1 wherein said inorganic material is present in an amount of about 50 to about 98 weight percent of said film.

5. The film as defined in claim 1 wherein there is present a sufficient amount of the plasticizer for said copolymer to impart additional flexibility properties to said film.

6. The film as defined in claim 5 wherein the ratio of said plasticizer to said copolymer is about 1:1 to about 1:4.

7. The film as defined in claim 1 wherein said olefin copolymerized with said $SO_2$ has from 12 to 20 carbon atoms.

8. The film as defined in claim 1 wherein said olefin copolymerized with said $SO_2$ has from 14 to 16 carbon atoms.

9. As an article of manufacture, a solid, flexible sealing tape consisting essentially of
   (1) at least one copolymer of $SO_2$ with an olefin having from 6 to 30 carbon atoms,
   (2) a plasticizer for said copolymer present in a ratio of about 1:1 to about 1:4 of plasticizer to copolymer, and
   (3) a finely divided sealing glass distributed through out said copolymer, said sealing glass being present in an amount of from about 80 to about 98 percent by weight of said tape, said copolymer being a binder for said sealing glass and being pyrolyzable at a temperature below the fusing temperature of said sealing glass and leaving substantially no carbonaceous residue when pyrolyzed, said plasticizer being fugitive at the temperature at which said copolymer pyrolyzes.

10. The sealing tape as defined in claim 9 wherein said sealing glass is present in an amount of about 90 to about 96 percent by weight of said tape.

11. The sealing tape as defined in claim 9 wherein said olefin is an alpha-olefin and said copolymer has an average molecular weight of from about 20,000 to about 100,000.

12. The sealing tape as defined in claim 10 wherein the olefin copolymerized with the $SO_2$ has from 14 to 16 carbon atoms.

13. A composition consisting essentially of about 2 to about 90 weight percent of at least one copolymer of $SO_2$ with an olefin having from 6 to 30 carbon atoms and having distributed throughout said copolymer about 10 to about 98 weight percent of a finely divided fusible or sinterable inorganic material, said copolymer being a binder for said inorganic material, said copolymer being pyrolyzable at a temperature below the sintering or fusing temperature of said inorganic material and leaving substantially no carbonaceous residue when pyrolyzed, and about 0–5 weight percent of a plasticizer fugitive at the temperature at which said coplymer pyrolyzes.

14. The composition defined in claim 13 wherein said inorganic material is a sealing glass.

15. The composition defined in claim 14 wherein the plasticizer for said copolymer is present in an amount sufficient to increase the flexibility of a film or strip formed from said composition.

16. The composition defined in claim 15 wherein said sealing glass is present in an amount of from about 80 to about 98 weight percent of the composition and the ratio of said plasticizer to said copolymer is about 1:1 to about 1:4.

17. The composition as defined in claim 14 wherein said sealing glass is present in an amount of from about 92 to about 97 percent by weight of the composition.

18. A method of bonding at least two surfaces together, said surfaces being selected from the group consisting of ceramic, glass, metal and metal alloy surfaces, which method comprises disposing between said surfaces a tape which is a thin, flexible, solid film of at least one pyrolyzable copolymer of sulfur dioxide and an olefin having from 6 to 30 carbon atoms, said copolymer having uniformly distributed therethrough finely divided sealing glass wherein the sealing glass constitutes about 90 to 98% by weight of said tape, thereafter subjecting the assembly of the two surfaces in sealing relation to a temperature sufficient to pyrolyze the polymer without leaving any undesirable carbonaceous deposit and sufficient to fuse the sealing glass and bond the two surfaces together.

References Cited

UNITED STATES PATENTS

| | | | |
|---|---|---|---|
| 3,227,591 | 1/1966 | Lambert et al. | 156—89 |
| 2,201,544 | 5/1940 | Marvel et al. | 260—94 |
| 2,474,350 | 6/1949 | Eilerman | 260—30.8 |
| 2,602,787 | 7/1952 | Crouch | 260—79.3 |

FOREIGN PATENTS

| | | | |
|---|---|---|---|
| 686,446 | 1/1953 | Great Britain | 260—79.3 |

OTHER REFERENCES

Modern Plastics Encyclopedia, vol. 44, No. 1A, September 1966, McGraw-Hill, New York, pp. 586–587.

DANIEL J. FRITSCH, Primary Examiner

U.S. Cl. X.R.

156—309; 161—168, 193, 196; 260—41 R, 41 A, 41 B, 79.3 A